Patented Sept. 18, 1934

1,973,840

UNITED STATES PATENT OFFICE 1,973,840

PURIFICATION OF ACETYLENE

Friedrich Zobel and Hans Reich, Mannheim, Germany, assignors to I. G. Farbenindustrie Aktiengesellschaft, Frankfort-on-the-Main, Germany No Drawing. Application June 1, 1931, Serial No. 541,551. In Germany June 2, 1930

5 Claims. (Cl. 260—170)

The present invention relates to improvements in the purification of acetylene.

The acetylene produced by thermal treatment of gases containing hydrocarbons above 750° C., preferably above 1000° C., as for example in the electric arc, or by the incomplete combustion of gaseous hydrocarbons, such as methane, often contains small amounts of, for example, 0.5 to 3 per cent, sometimes more or sometimes less, of allylene, diacetylene, allene and similar highly unsaturated hydrocarbons, the exact nature of all which has not been determined, as impurities, which injuriously affect further conversions with catalysts. Thus for example, in the hydration of acetylene with water vapor at elevated temperatures, a rapid decrease in the activity of the catalysts is often observed.

We have now found that the said crude acetylene derived from thermal treatments is rendered suitable for subsequent catalytic conversions by polymerizing the unsaturated hydrocarbons contained therein by bringing the said crude acetylene into contact with an agent which has a polymerizing action on the said impurities consisting of highly unsaturated hydrocarbons contained therein. The polymerizing agents employed are sulphuric acid, phosphoric acid, metaphosphoric acid or mixtures thereof, and the acid salts of the said acids, in particular acid phosphates, further anhydrous inorganic metal halides having an acid reaction when dissolved in water, such as aluminium chloride, ferric chloride, stannous chloride or zinc chloride, substances having a large superficial area, such as active carbon, silica gel, kieselguhr or bleaching earths, or finely divided oxides of metals of the groups 2 to 4 and 7 of the periodic system, which are not reducible to the metal with hydrogen, at temperatures below 600° C., such as the oxides of manganese, titanium, thorium, tin, cerium, aluminium or calcium. The said substances in so far as they are solid may also be employed as mixtures. The working conditions, in particular the temperatures, depend on the greater or less activity of the polymerizing agent employed and should be so selected that the impurities present are rendered inactive but that the acetylene itself is not appreciably changed. When selecting the working conditions, the content of acetylene in the gas should also be taken into account, because the conditions may be energetic with dilute acetylene, while with a high content of acetylene mild agents must be employed in order that the acetylene should not be affected. If required, diluents, such as hydrogen or nitrogen may be added, particularly in cases where these gases do not have an undesirable effect or are even required in the subsequent conversion.

To illustrate the variation of working conditions, it may be mentioned that when employing strong polymerizing agents, as for example sulphuric acid, aluminium chloride and the like, the purification of the acetylene is carried out at low temperatures as for example 10° to 30° C., while, when employing less strong polymerizing agents, such as phosphoric acid, and especially substances having a large superficial area, such as kieselguhr, silica gel, active carbon, bleaching earths, or finely divided difficultly reducible oxides and the like, elevated temperatures, as for example from 200° to 300° C. must be employed in order completely to remove the impurities and these temperatures may be employed without the loss of any appreciable amount of acetylene. Zinc chloride may be employed even at temperatures above 100° C. The impurities are usually polymerized to form oily or solid products of high boiling point which may be readily separated from the gas, if desired, with the aid of condensers, or stripping vessels or both.

The substances having a large superficial area and the finely divided difficultly reducible metal oxides have proved particularly advantageous in practice.

The purification of the acetylene may be effected at atmospheric, reduced or increased pressure through atmospheric pressure is most advantageous in practice. The polymerizing agents may be precipitated on carriers such as pumice stone or burnt fire-clay or dispersed in such substances which then act as diluents.

The process according to the present invention is particularly suitable for removing the last traces of impurities contained in the acetylene gas, which traces were very difficult to be removed by the methods hitherto in use.

The following examples will further illustrate the nature of this invention but the invention is not restricted to these examples.

*Example 1*

A crude gas containing 7.5 per cent of acetylene besides hydrogen, methane and nitrogen which is obtained by the treatment of natural gas in an electric arc is so led at 15° C. through a trickle tower over the filler of which sulphuric acid of 95 per cent strength is pumped, that the gas remains in contact with the acid for about 1½ minutes. No appreciable amount of acetylene is polymerized under these conditions, but the injurious impurities contained in the crude gas are removed so that the gas may then be well worked up, for example into acetaldehyde. The sulphuric acid gradually assumes a tarry appearance.

Example 2

A 7 per cent acetylene also containing hydrogen, methane and nitrogen and obtained by the treatment of methane in the electric arc and which has been washed with caustic soda solution is led for about 0.5 to 1 minute over silica gel at 250° C. The acetylene remains unchanged while the impurities are deposited behind the reaction chamber as a dark oil. The gas may then be readily converted in catalytic processes.

Example 3

A gas containing 80 per cent of acetylene, besides methane and nitrogen obtained by fractionation under pressure enrichment of a gas obtained by treatment of methane in the electric arc is led for about 0.5 to 1 minute over a layer of active carbon heated to 275° C. The strongly unsaturated impurities in the initial gas separate completely from the cooled gas as a black tar without any appreciable decrease in the amount of acetylene. In the catalytic hydration of the resulting acetylene in the gaseous phase, no rapid decrease in the activity of the catalysts takes place, as would otherwise be the case.

Example 4

A crude gas derived from a treatment of natural gas in an electric arc and containing 85 per cent of acetylene besides methane and nitrogen, is passed at a temperature of about 270° to 280° C. over natural granular pyrolusite, or over pyrolusite, deposited on pumice stone, the gas remaining in contact with the polymerizing agent for about 0.5 minute. The polymerized impurities are separated in the form of a dark-colored oil in a stripping vessel.

What we claim is:

1. A process for the purification of crude acetylene derived from a thermal treatment of a gas comprising hydrocarbons, and which contains highly unsaturated hydrocarbons as impurities, which comprises polymerizing the said unsaturated hydrocarbons at a temperature between 200° and 300° C. by the action of a material having a large surface area and a polymerizing activity comparable with that of silica gel which is selected from the group consisting of silica gel, active carbon, kieselguhr, bleaching earths and finely divided oxides of metals of the groups 2 to 4 and 7 of the periodic system.

2. A process for the purification of crude acetylene derived from a thermal treatment of a gas comprising hydrocarbons, and which contains highly unsaturated hydrocarbons as impurities, which comprises polymerizing the said unsaturated hydrocarbons by the action of a catalyst essentially comprising silica gel at a temperature between 200° and 300° C.

3. A process for the purification of crude acetylene obtained by treatment of a gas containing a hydrocarbon in the electric arc and which contains highly unsaturated hydrocarbons as impurities, which comprises polymerizing the said unsaturated hydrocarbons by contacting said crude acetylene with sulphuric acid of about 95 per cent strength at a temperature between about 10° and 30° C.

4. A process for the purification of crude acetylene obtained by treatment of methane in the electric arc and which contains highly unsaturated hydrocarbons as impurities, which comprises polymerizing the said unsaturated hydrocarbons by contacting said crude acetylene with pyrolusite deposited on pumice stone at about from 270° to 280° C.

5. A process for the purification of crude acetylene obtained by treatment of a gas containing a hydrocarbon in the electric arc and which contains highly unsaturated hydrocarbons as impurities, which comprises subjecting said crude acetylene to the action of a catalyst essentially comprising an agent having a polymerizing action on the said unsaturated hydrocarbons and selected from the group consisting of sulphuric acid, phosphoric acid, meta-phosphoric acid, the acid salts of these acids, anhydrous inorganic metal halides having an acid reaction when dissolved in water, substances having a large superficial area and finely divided oxides of metals of groups 2 to 4 and 7 of the periodic system which are not reducible to the metal with hydrogen at temperatures below 600° C. at a temperature which is lower the greater the activity of the polymerizing agent, being of the order of 10 to 30° C. with a polymerizing agent having an activity comparable with that of sulphuric acid and being of the order of 200 to 300° C. with a polymerizing agent having an activity comparable with that of silica gel.

FRIEDRICH ZOBEL.
HANS REICH.